(12) United States Patent
Ikemoto et al.

(10) Patent No.: US 9,709,131 B2
(45) Date of Patent: Jul. 18, 2017

(54) MANUAL TRANSMISSION

(71) Applicant: MAZDA MOTOR CORPORATION, Hiroshima (JP)

(72) Inventors: Takayuki Ikemoto, Hatsukaichi (JP); Norihide Urabayashi, Hiroshima (JP); Tatsuya Hironaka, Hofu (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 232 days.

(21) Appl. No.: 14/431,519

(22) PCT Filed: Jan. 14, 2014

(86) PCT No.: PCT/JP2014/000126
§ 371 (c)(1),
(2) Date: Mar. 26, 2015

(87) PCT Pub. No.: WO2014/112356
PCT Pub. Date: Jul. 24, 2014

(65) Prior Publication Data
US 2015/0204419 A1    Jul. 23, 2015

(30) Foreign Application Priority Data
Jan. 16, 2013   (JP) ................ 2013-005456

(51) Int. Cl.
*F16H 3/08*   (2006.01)
*F16H 3/00*   (2006.01)
(Continued)

(52) U.S. Cl.
CPC ............ *F16H 3/006* (2013.01); *F16H 3/08* (2013.01); *F16H 63/302* (2013.01);
(Continued)

(58) Field of Classification Search
CPC .......... F16H 3/006; F16H 3/08; F16H 63/302; F16H 63/3069; F16H 3/089
See application file for complete search history.

(56) References Cited

U.S. PATENT DOCUMENTS 4,472,868 A * 9/1984 Takahashi ............... F16H 63/20
                                                        29/434
4,745,824 A * 5/1988 Hiraiwa ................ F16H 63/302
                                                        192/218
(Continued)

FOREIGN PATENT DOCUMENTS

JP    S61-129961 U    8/1986
JP    S61-171961 A    8/1986
(Continued)

OTHER PUBLICATIONS

International Search Report; PCT/JP2014/000126; Apr. 1, 2014.

*Primary Examiner* — David M Fenstermacher
(74) *Attorney, Agent, or Firm* — Studebaker & Brackett PC

(57) ABSTRACT

When a reverse select operation is performed, a pre-balk lever (180) rotates to a rotation position as a control rod (100) rotates. The pre-balk lever (180) has an engagement portion (190), which engages with a tip end portion of a pre-balk pin (162) at the rotation position. As a reverse lever (136) swings while they are engaged with each other, a shift rod (113) moves in such a direction as to activate a synchronizer (60). The engagement portion (190) has a guide surface (192), which guides the tip end portion of the pre-balk pin (162) to the engagement position while the pre-balk lever (180) is rotating toward the rotation position.

6 Claims, 12 Drawing Sheets

(51) Int. Cl.
*F16H 63/30* (2006.01)
*F16H 3/089* (2006.01)

(52) U.S. Cl.
CPC ......... *F16H 63/3069* (2013.01); *F16H 3/089* (2013.01); *F16H 2200/0052* (2013.01); *Y10T 74/19251* (2015.01)

(56) References Cited

U.S. PATENT DOCUMENTS

| | | | | |
|---|---|---|---|---|
| 6,164,149 A | * | 12/2000 | Ohmori | F16H 61/30 |
| | | | | 477/121 |
| 7,810,627 B2 | * | 10/2010 | Saitoh | F16H 63/304 |
| | | | | 192/219.5 |
| 2002/0134187 A1 | * | 9/2002 | Koyama | F16H 63/302 |
| | | | | 74/473.28 |
| 2004/0177714 A1 | * | 9/2004 | Ronge | F16H 63/206 |
| | | | | 74/473.37 |
| 2005/0005724 A1 | * | 1/2005 | Murai | F16H 63/20 |
| | | | | 74/473.36 |
| 2006/0060020 A1 | * | 3/2006 | Beer | F16H 61/24 |
| | | | | 74/473.37 |
| 2013/0047760 A1 | * | 2/2013 | Ohmori | F16H 61/0437 |
| | | | | 74/331 |
| 2014/0283641 A1 | * | 9/2014 | Neelappa | F16H 59/04 |
| | | | | 74/473.33 |
| 2015/0204419 A1 | * | 7/2015 | Ikemoto | F16H 3/006 |
| | | | | 74/335 |

FOREIGN PATENT DOCUMENTS

| | | |
|---|---|---|
| JP | S61-171962 A | 8/1986 |
| JP | 2005-155800 A | 6/2005 |
| JP | 2011-002078 A | 1/2011 |
| JP | 2012-077856 A | 4/2012 |

\* cited by examiner

MANUAL TRANSMISSION

BACKGROUND OF THE INVENTION

The present invention relates to a manual transmission mounted in a vehicle, and relates to the field of a power transmission technology for vehicles.

DESCRIPTION OF RELATED ART

A manual transmission for an automobile generally includes a primary shaft and a secondary shaft. The primary shaft is coupled through a clutch to an output shaft of an engine. The secondary shaft is arranged parallel to the primary shaft and coupled through a differential gear to driving wheels. Gear trains are arranged between these shafts so that each of the gear trains is provided for an associated one of gears. The manual transmission is configured so that in response to a driver's operation of a shift lever, power is transmitted through only a gear train corresponding to his or her desired gear.

A manual transmission of this type usually includes constant-mesh gear trains as gear trains for forward gears. The constant-mesh gear trains each include a fixed gear which is fixed to one of the primary and secondary shafts, and an idler gear loosely fitted to the other one shaft. The fixed gear and the idler gear are in constant mesh. When the transmission is shifted to a predetermined gear while a vehicle is moving, the rotations of the idler gear in a gear train corresponding to the predetermined gear and the other shaft are synchronized by a corresponding one of synchronizers to enable smooth transmission of power through the gear train.

On the other hand, a manual transmission generally includes a sliding-mesh gear train as a reverse gear train. The sliding-mesh reverse gear train includes a primary reverse gear fixed to the primary shaft, a secondary reverse gear fixed to the secondary shaft, and a reverse idler gear supported on a reverse shaft such that the reverse idler gear is slidable thereon along the axis of the reverse shaft. When a shift operation to a reverse gear is performed using a shift lever, the reverse idler gear slides along the axis of the reverse shaft to mesh with the primary and secondary reverse gears. This enables the transmission of power through the reverse gear. The shift operation to the reverse gear is usually performed while a vehicle is at a stop. That is why the gears of the reverse gear train can be in mesh without using a synchronizer such as the one used for a forward gear. Furthermore, by using the sliding-mesh gear train, the synchronizer can be omitted, and therefore, the cost can be cut down.

If a sliding-mesh gear train is used as a reverse gear train, however, when a shift operation to the reverse gear is performed immediately after a vehicle in forward motion has stopped, noise called "gear rattle" may be unfortunately generated. The reason is that when a clutch is disengaged to stop the vehicle, inertial rotation of a primary shaft continues immediately after the disengagement of the clutch. This is also because, when a reverse idler gear is going to be meshed with a primary reverse gear rotating together with the primary shaft, the teeth of these gears interfere with each other. Note that a secondary shaft, which is constantly drivingly connected to the driving wheels, is at rest together with the driving wheels while the vehicle is at a stop.

To address this problem, a so-called "pre-balk mechanism" such as the one disclosed in, for example, Japanese Unexamined Patent Publication No. 2011-002078 may be used.

At an early stage of the shift operation to the reverse gear, the pre-balk mechanism brakes the inertial rotation of a primary shaft by utilizing a synchronizer for a predetermined forward gear. Specifically, a sleeve of the synchronizer is moved on the primary shaft along the axis of the primary shaft in sync with the shift operation to the reverse gear, thereby synchronizing the primary shaft with a primary gear at rest and allowing a braking force to act on the primary shaft.

Subsequently, at a later stage of the shift operation to the reverse gear, the sleeve of the synchronizer is returned to a neutral position at the time when the braking action by the synchronizer stops the inertial rotation of the primary shaft, and the synchronizer is thus deactivated to stop transmitting the power through a forward gear. Thereafter, a reverse idler gear gets meshed with a primary reverse gear and a secondary reverse gear. At this time, the primary reverse gear and the secondary reverse gear are both at rest. This facilitates meshing the reverse idler gear with both of the gears, and can prevent gear rattle.

SUMMARY OF THE INVENTION

A specific configuration for a pre-balk mechanism and members working in conjunction with the mechanism will be described with reference to FIGS. 10-12 with respect to the manual transmission disclosed in Japanese Unexamined Patent Publication No. 2011-002078.

As illustrated in FIG. 10, the manual transmission of Japanese Unexamined Patent Publication No. 2011-002078 includes a plurality of shift rods 205 and 206 which are arranged parallel to each other, and a control rod 202 which is arranged to run perpendicularly to the shift rods 205 and 206. Although only one shift rod 205 is supposed to be provided in FIG. 10 for a forward gear, a plurality of shift rods are actually provided for multiple forward gears.

As illustrated in FIGS. 10 and 11, shift rod ends 213, 214, 215, and 216 are each fixed to an associated one of the shift rods 205, 206, and the tip end portions of the shift rod ends 213, 214, 215, and 216 have engagement recesses 213*a*, 214*a*, 215*a*, and 216*a*, respectively. These engagement recesses 213*a*-216*a* are arranged along the axis of the control rod 202, so as to be opened toward the control rod 202.

When a select operation is performed with a shift lever, the control rod 202 moves along its axis, and a shift finger 212 of the control rod 202 selectively engages with any one of the engagement recesses 213*a*-216*a* of the shift rod ends 213-216. When a shift operation is performed with the shift lever in such an engagement state, the shift finger 212 rotates together with the control rod 202 on its axis to cause one of the shift rod ends 213-216 engaging with the shift finger 212 to move in the axial direction together with the shift rods 205, 206 provided with the respective shift rod ends 213-216.

The reverse shift rod end 216 further has another engagement recess 216*b* besides the engagement recess 216*a* engaging with the shift finger 212. As illustrated in FIG. 11, one end portion of a reverse lever 220 is engaged with the engagement recess 216*b*, and the other end portion of the reverse lever 220 is engaged with a reverse idler gear 230.

With this configuration, when a reverse shift operation is performed with a reverse position selected, the shift finger 212 rotates together with the control rod 202 on its axis in the direction indicated by the arrow A, and the reverse shift rod end 216 engaging with the shift finger 212 moves in the axial direction in the direction indicated by the arrow B as shown in FIG. 10. Thus, as illustrated in FIG. 11, the reverse lever 220 engaging with the reverse shift rod end 216 swings in the direction indicated by the arrow C, and the reverse idler gear 230 engaging with the reverse lever 220 slides in the axial direction on a reverse shaft 232 to mesh with a primary reverse gear (not shown) and a secondary reverse gear (not shown) in this order. In this manner, power is transmitted through a reverse gear train.

Furthermore, as illustrated in FIG. 12, the pre-balk mechanism used in the manual transmission of Japanese Unexamined Patent Publication No. 2011-002078 includes a pre-balk pin 240 and an engagement recess 215b. The pre-balk pin 240 is provided for the control rod 202 at a different axial position from the shift finger 212. The engagement recess 215 has been cut on the shift rod end 215 for a predetermined forward gear so as to engage with the pre-balk pin 240 when a reverse position selected. Thus, if the pre-balk pin 240 has rotated together with the control rod 202 in the direction indicated by the arrow A when the reverse shift operation is performed, the shift rod end 215 for the forward gear and the shift rod 205 for the forward gear axially moves in the direction indicated by the arrow D. The shift rod end 215 for the forward gear engages with the pre-balk pin 240, and is fixed to the shift rod 205 for the forward gear. In the meantime, a sleeve 262 of a synchronizer 260 engaging with a shift fork 250, as well as the shift fork 250 fixed to the shift rod 205, move in the axial direction indicated by the arrow D to activate the synchronizer 260 and cause a braking force to act on inertial rotation of a primary shaft.

The synchronizer 260 is deactivated in the middle of a time period during which the reverse lever 220 is swinging. Specifically, in the middle of that swinging time period, the pre-balk pin 240 is disengaged from the engagement recess 215b of the shift rod end 215 for the forward gear. At the same time, while a protrusion 222 of the reverse lever 220 is pressed against a cam surface 215c of the shift rod end 215 illustrated in FIG. 11, the swing of the reverse lever 220 causes the shift rod end 215 and the shift rod 205 to be pressed, and move axially in the direction indicated by the arrow E, and return to the neutral position. In this manner, the synchronizer 260 is deactivated, and power can be transmitted through the reverse gear train after that.

According to the technique of Japanese Unexamined Patent Publication No. 2011-002078, the control rod 202 configured to axially move in sync with a select operation using the shift lever is provided with a pre-balk pin 240 and the shift rod end 215 for the predetermined forward gear has an engagement recess 215b to get engaged with the pre-balk pin 240. In that case, however, to ensure that the pre-balk pin 240 that moves axially together with the control rod 202 in sync with a reverse select operation is fitted into the engagement recess 215b without interfering with the shift rod end 215 for the forward gear, a certain gap S needs to be left between the pre-balk pin 240 and inner surface of the engagement recess 215b that are engaged with each other, considering error inevitably caused between individual products or during an assembling process.

In that case, however, there is some time lag between a point in time when the pre-balk pin 240 starts rotating together with the control rod 202 in sync with a reverse shift operation using the shift lever and a point in time when the pre-balk pin 240 contacts with the inner surface of the engagement recess 215b. Consequently, the start of the axial movement of the shift rod end 215 for the forward gear having the engagement recess 215b and the activation of the synchronizer 260 are delayed accordingly.

Thus, such a delay in the activation of the synchronizer 260 may cause the reverse idler gear 230 sliding to reach a position where the primary reverse gear is to mesh with the reverse idler gear 230 before the rotation of the primary shaft is stopped, thus possibly generating some gear rattle, which is a problem. To eliminate gear rattle perfectly even when there is such a delay in activation of the synchronizer 260, the stroke over which the reverse idler gear 230 slides could be increased, which would increase the sizes of the reverse idler gear 230 and its surrounding members.

It is therefore an object of the present invention to downsize a reverse idler gear and its surrounding members in a manual transmission including a sliding-mesh reverse gear train and to eliminate gear rattle that would otherwise occur when a shift operation to a reverse gear is performed.

To overcome these problems, a manual transmission according to the present invention is configured as follows.

First, a manual transmission includes: a primary shaft coupled through a connector/disconnector to a vehicle-driving source; a secondary shaft arranged parallel to the primary shaft; a plurality of forward gear trains arranged between the primary and secondary shafts; a reverse gear train including a primary reverse gear fixed on the primary shaft, a secondary reverse gear fixed on the secondary shaft, and a reverse idler gear arranged slidably on a reverse shaft that is arranged parallel to the primary and secondary shafts, the reverse idler gear being configured to slide from a neutral position on the reverse shaft to a mesh position at which the reverse idler gear meshes with the primary and secondary reverse gears to enable transmission of power through a reverse gear; at least one shift rod configured to move axially in sync with a shift operation using a shift lever to selectively transmit power through one of the forward gear trains via at least one synchronizer; a control rod arranged parallel to the shift rod and configured to rotate in sync with a select operation using the shift lever; a reverse lever configured to, in a situation where a reverse select operation is performed with the shift lever, swing in sync with a reverse shift operation using the shift lever to slide the reverse idler gear from the neutral position to the mesh position; and a pre-balk mechanism configured to activate a predetermined synchronizer during an early stage of a time period during which the reverse lever swings and to deactivate the predetermined synchronizer during a middle stage of the time period, the predetermined synchronizer enabling transmission of power through any one of the forward gear trains. The pre-balk mechanism includes a pre-balk pin configured to swing together with the reverse lever in sync with the reverse shift operation using the shift lever, and a pre-balk lever arranged on a predetermined shift rod, which activates the predetermined synchronizer, so as to be rotatable on its axis but prevent its axial movement, the pre-balk lever rotating to a predetermined rotation position in sync with the rotation of the control rod when the reverse select operation is performed with the shift lever, the pre-balk lever includes an engagement portion engaging with a tip end portion of the pre-balk pin at the predetermined rotation position such that when the reverse lever swings in sync with the reverse shift operation with the engagement portion engaging with the pre-balk pin, the predetermined shift rod moves in such a direction as to activate the predetermined synchronizer via the pre-balk pin and the pre-balk lever, and the engagement portion has a guide surface configured to guide the tip end portion of the pre-balk pin to a predetermined engagement position at which the tip end portion engages with the engagement portion while the pre-balk lever is rotating toward the predetermined rotation position in sync with the reverse select operation using the shift lever.

According to the claimed invention, the manual transmission may further include: a return mechanism configured to cause an axial position of the predetermined shift rod to go back from a position at which the predetermined synchronizer is activated to a position at which the predetermined synchronizer is deactivated. The return mechanism includes a spring configured to urge the pre-balk lever axially toward the position at which the predetermined synchronizer is deactivated.

According to the claimed invention, the spring is configured to apply an urging force to the pre-balk lever only when a reverse select operation has been performed.

According to the claimed invention, the pre-balk pin is arranged to be rotatable relative to the reverse lever when the reverse lever swings in an opposite direction from when the reverse shift operation is performed with the shift lever.

First, according to the claimed invention, when a reverse select operation is performed with a shift lever, a pre-balk lever provided for a predetermined shift rod rotates to a predetermined rotation position in sync with the rotation of the control rod. As a result, the tip end portion of a pre-balk pin swinging together with a reverse lever gets engaged with an engagement portion of the pre-balk lever. The engagement portion of the pre-balk lever has a guide surface guiding the tip end portion of the pre-balk pin to a predetermined engagement position for the tip end portion. Thus, even if the tip end portion of the pre-balk pin contacts with the guide surface of the engagement portion while the pre-balk lever is rotating toward the predetermined rotation position as described above, the pre-balk lever can still continue rotating until the lever reaches the predetermined rotation position while guiding the tip end portion of the pre-balk pin on the guide surface to the predetermined engagement position.

Thus, according to the claimed invention, even if the gap between the engagement portion of the pre-balk lever and the tip end portion of the pre-balk pin that are engaged with each other is minimized, the rotation of the pre-balk lever will never be interfered with by these portions, thus allowing these portions to engage with each other properly. This can minimize the gap between those portions that are engaged with each other. Thus, the pre-balk lever and a shift rod provided with the pre-balk lever can start moving axially almost as soon as the pre-balk pin starts swinging by a reverse shift operation using the shift lever. As a result, in sync with the reverse shift operation, the predetermined synchronizer can be activated earlier, so that inertial rotation of the primary shaft can be braked rapidly. Consequently, the reverse idler gear can mesh with the primary reverse gear with the primary shaft restrained, thereby eliminating gear rattle that would otherwise be caused by interference between those gears.

Since the rotation of the primary shaft can be braked more rapidly as described above, the stroke in which the reverse idler gear slides can be reduced, which contributes to cutting down the size of the reverse idler gear and its surrounding members.

Furthermore, according to the claimed invention, a spring that urges the pre-balk lever axially toward such a direction as to deactivate the predetermined synchronizer is used as a return mechanism to cause the axial position of the predetermined shift rod to go back from the position at which the predetermined synchronizer is activated to the position at which the predetermined synchronizer is deactivated. Thus, the shift rod itself does not have to be subjected to a machining process that would have to be performed if a detent mechanism, for example, were used as the return mechanism. Consequently, the shift rod can have a shorter length, and eventually the manual transmission can have a smaller overall size, compared to such a situation.

Furthermore, if the claimed invention as applied above, an urging force applied by the spring functioning as the return mechanism acts only when a reverse select operation has been performed, not when a neutral position or a forward position is selected. Thus, the operability of a shift operation to a forward gear is never affected by the urging force applied by the spring.

According to the claimed invention, the pre-balk pin is arranged to be rotatable relative to the reverse lever when the reverse lever swings in the opposite direction from when the reverse shift operation is performed with the shift lever. Thus, when the pre-balk pin swings together with the reverse lever in sync with the reverse shift operation using the shift lever, the pre-balk pin is disengaged from the engagement portion of the pre-balk lever. If a shift operation is performed to cause the shift lever to go back from the reverse position to the neutral position, and the reverse lever swings, in sync with the shift operation, in the opposite direction from when the reverse shift operation has been performed, the swing of the pre-balk pin in the opposite direction may be restricted due to interference between the pre-balk lever and the reverse lever. Even so, the reverse lever can continue swinging independently of the pre-balk pin, thus ensuring that the reverse lever goes back to the neutral position.

DETAILED DESCRIPTION OF THE INVENTION

Exemplary embodiments will now be described in detail with reference to the drawings. The technique disclosed herein is not limited to these exemplary embodiments, but is applicable to other embodiments in which modifications, changes, substitutions, additions, and/or omissions, for example, are made as necessary. Optionally, a new embodiment may be created by combining the elements to be described below. Further, the elements illustrated on the accompanying drawings and/or mentioned in the following detailed description include not only essential elements that need to be used to overcome, the problems described above but also other inessential elements that do not have to be used to overcome those problems but are just mentioned or illustrated to give an example of the present disclosure. Therefore, please do not make a superficial decision that those inessential additional elements are indispensable ones simply because they are illustrated or mentioned on the drawings or the description.

Figure 1:
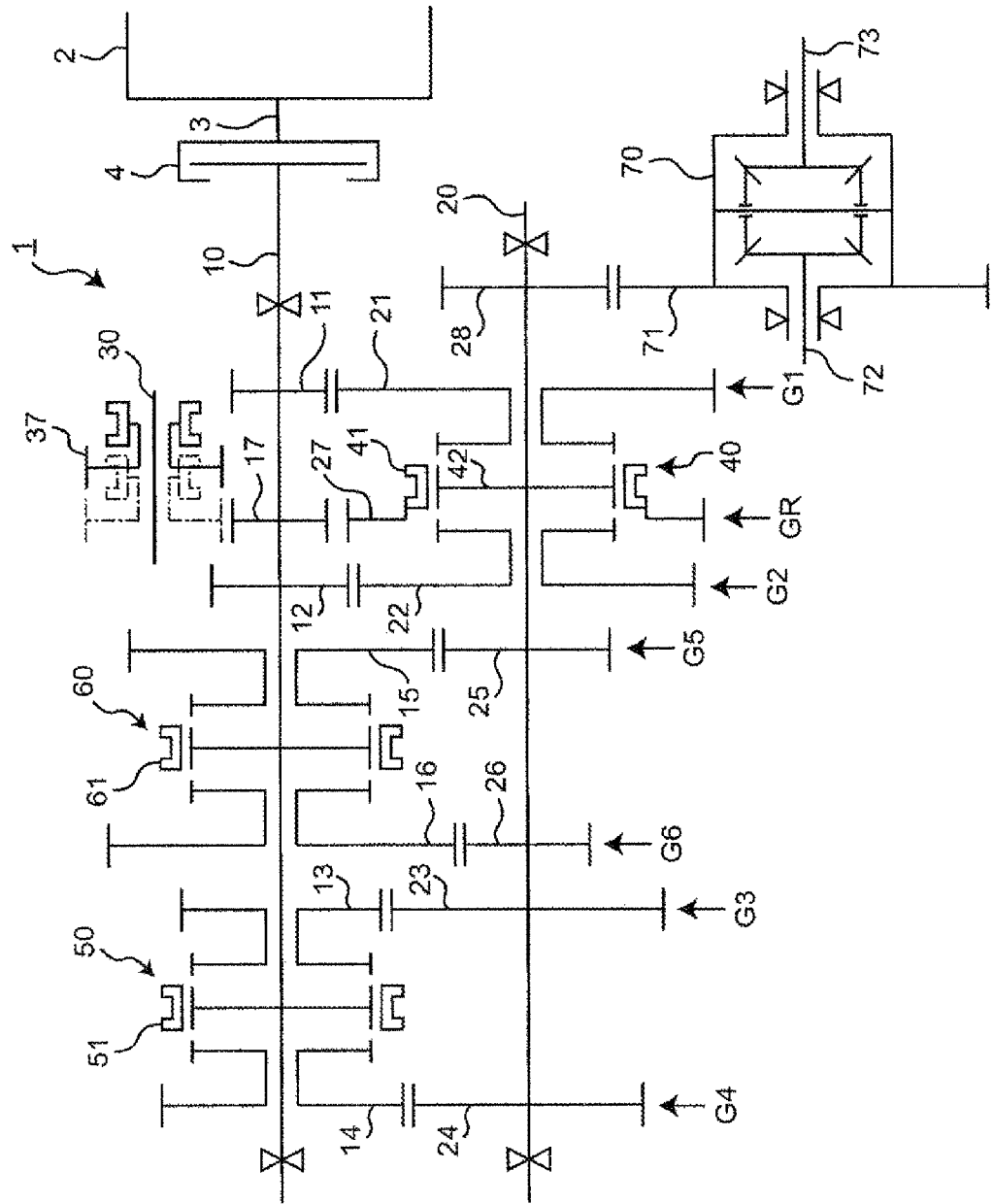
FIG. 1 is a skeleton diagram of a manual transmission according to an embodiment of the present invention.

As illustrated in FIG. 1, a manual transmission 1 according to this embodiment includes six forward gears and one reverse gear, and includes a primary shaft 10 and a secondary shaft 20. The primary shaft 10 is coupled through a clutch 4 to an output shaft 3 of an engine 2. The secondary shaft 20 is arranged parallel to the primary shaft 10.

The secondary shaft 20 is coupled through a differential gear 70 to driving wheels (not shown). Specifically, an end portion of the secondary shaft 20 near the engine is provided with an output gear 28, which meshes with an input gear 71 of the differential gear 70. Thus, the rotation of the secondary shaft 20 is transmitted through the differential gear 70 to right and left axles 72 and 73, and is further transmitted to the driving wheels each coupled to a corresponding one of the axles 72 and 73.

A first gear train G1, a reverse gear train GR, a second gear train G2, a fifth gear train G5, a sixth gear train G6, a third gear train G3, and a fourth gear train G4 are arranged in this order from the engine side toward the other side between the primary and secondary shafts 10 and 20.

The first gear train G1 is comprised of a primary gear 11 and a secondary gear 21, and the second gear train G2 is comprised of a primary gear 12 and a secondary gear 22. The primary gears 11 and 12 are fixed to the primary shaft 10. The secondary gears 21 and 22 are loosely fitted to the secondary shaft 20. The third through sixth gear trains G3-G6 each include an associated one of primary gears 13-16 loosely fitted to the primary shaft 10, and an associated one of secondary gears 23-26 fixed to the secondary shaft 20.

A synchronizer 40 for first and second gears is arranged between the first- and second-gear secondary gears 21 and 22 on the secondary shaft 20. A synchronizer 50 for third and fourth gears is arranged between the third- and fourth-gear primary gears 13 and 14 on the primary shaft 10. A synchronizer 60 for fifth and sixth gears is arranged between the fifth- and sixth-gear primary gears 15 and 16 also on the primary shaft 10.

When a shift operation to any of the forward gears is performed with a shift lever (not shown), activated is only one of the synchronizers 40, 50, and 60 that is associated with the gear newly selected through the shift operation. As a result, power is transmitted between the primary and secondary shafts 10 and 20 selectively through one of the forward gear trains G1-G6 corresponding to the gear newly selected through the shift operation. For example, if the shift operation to the first or second gear is performed with the shift lever, a sleeve 41 of the synchronizer 40 for the first and second gears slides, responsive to the shift operation, on the secondary shaft 20 toward, or away from, the engine. A loosely fitted gear (21 or 22) to which the sleeve 41 has slid is fixed to the secondary shaft 20 to transmit power through a gear train (G1 or G2) corresponding to the gear that has been selected through the shift operation. Also, if a shift operation to any one of the third through sixth gears is performed with the shift lever, an associated one of a sleeve 51 of the synchronizer 50 for the third and fourth gears and a sleeve 61 of the synchronizer 60 for the fifth and sixth gears slides, in sync with the shift operation, on the primary shaft 10 toward, or away from, the engine. A loosely fitted gear (13, 14, 15, or 16) to which the sleeve 51 or 61 has slid is fixed to the primary shaft 10 to transmit power through the gear train (G3, G4, G5, or G6) corresponding to the gear newly selected through the shift operation.

On the other hand, the reverse gear train GR is a sliding-mesh gear train, and includes a primary reverse gear 17 fixed to the primary shaft 10, a secondary reverse gear 27 fixed to the secondary shaft 20, and a reverse idler gear 37 fitted to a reverse shaft 30 which is arranged parallel to the primary and secondary shafts 10 and 20. The reverse idler gear 37 is slidable along the axis of the reverse shaft 30.

The secondary reverse gear 27 is not fixed directly to the secondary shaft 20, but is arranged on the sleeve 41 of the synchronizer 40 for the first and second gears. In the synchronizer 40, this sleeve 41 is spline-fitted to a hub 42 fixed to the secondary shaft 20. Thus, strictly speaking, the secondary reverse gear 27 provided on the sleeve 41 is fixed to the secondary shaft 20 in the direction of rotation but is movable in the axial direction.

If a shift operation to a reverse position is performed with the shift lever, the reverse idler gear 37 slides, in sync with the shift operation, in the axial direction away from the engine, and meshes with the primary and secondary reverse gears 17 and 27. Thus, power is transmitted through the reverse gear train GR.

Figure 2:
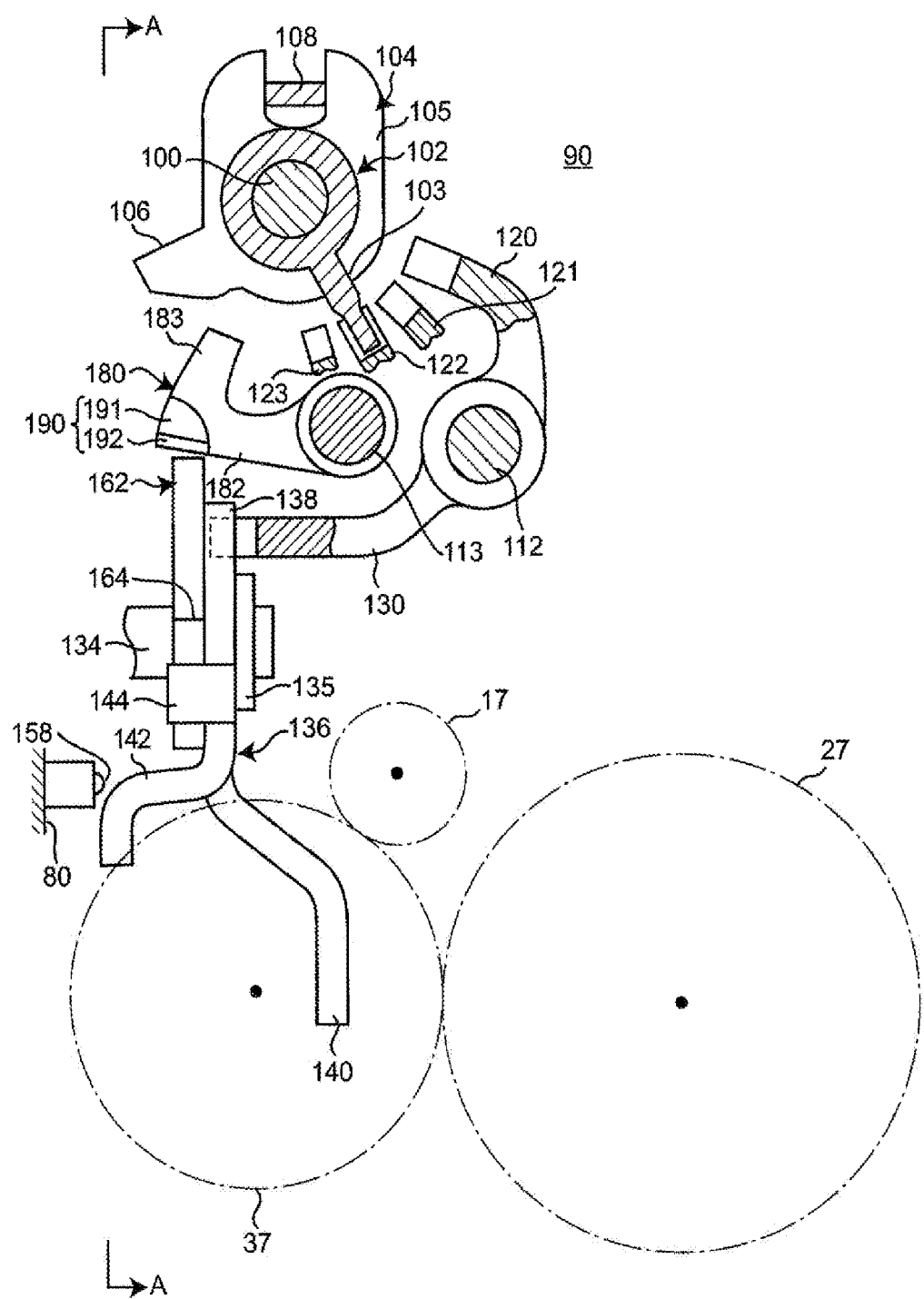
FIG. 2 is a cross-sectional view of essential parts of a transmission operating mechanism for the manual transmission as viewed from the other side opposite from the engine in the axial direction.
Figure 4:
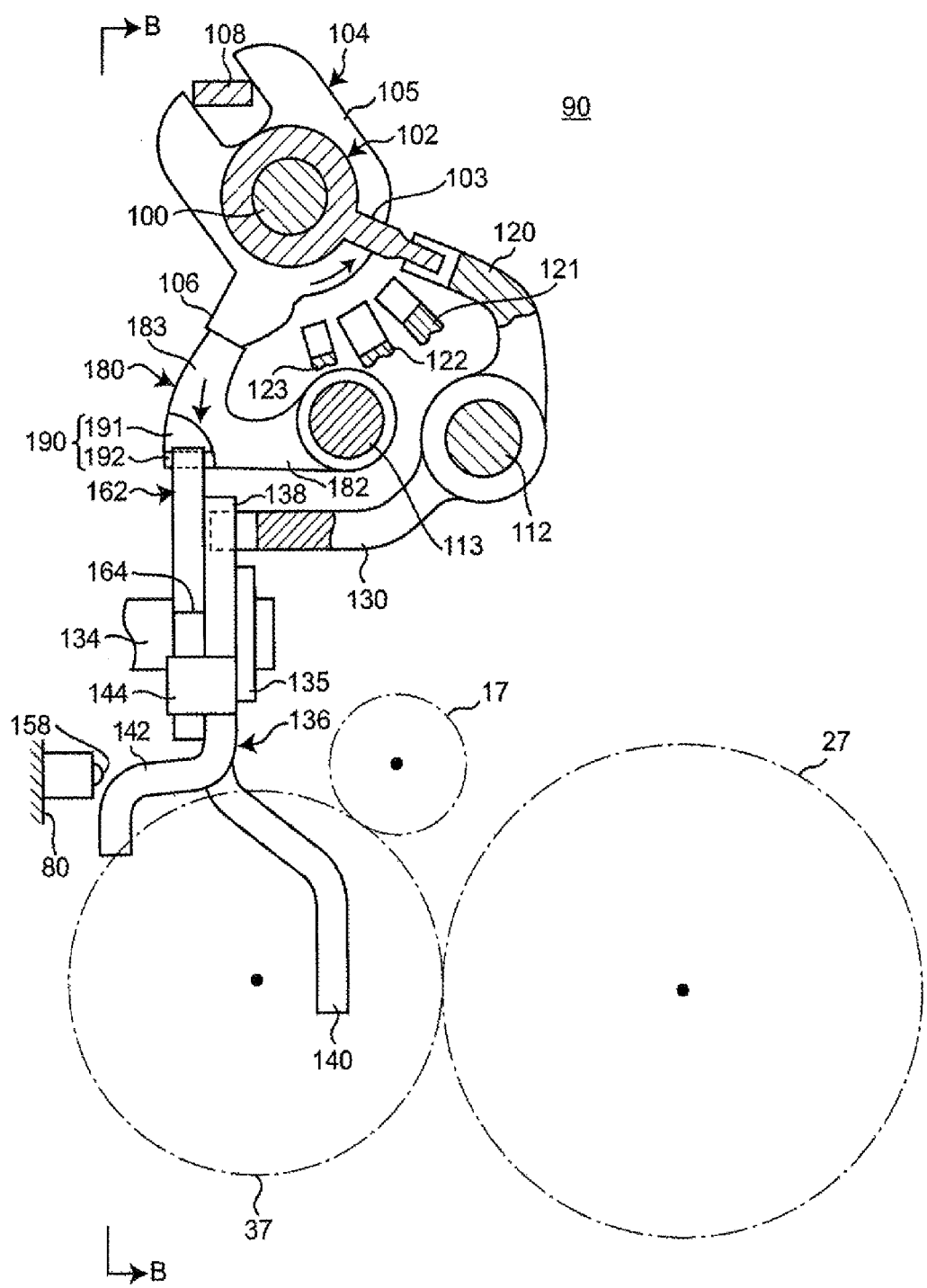
FIG. 4 illustrates the transmission operating mechanism when a reverse select operation has been performed as viewed in the same direction as in FIG. 2.
Figure 5:
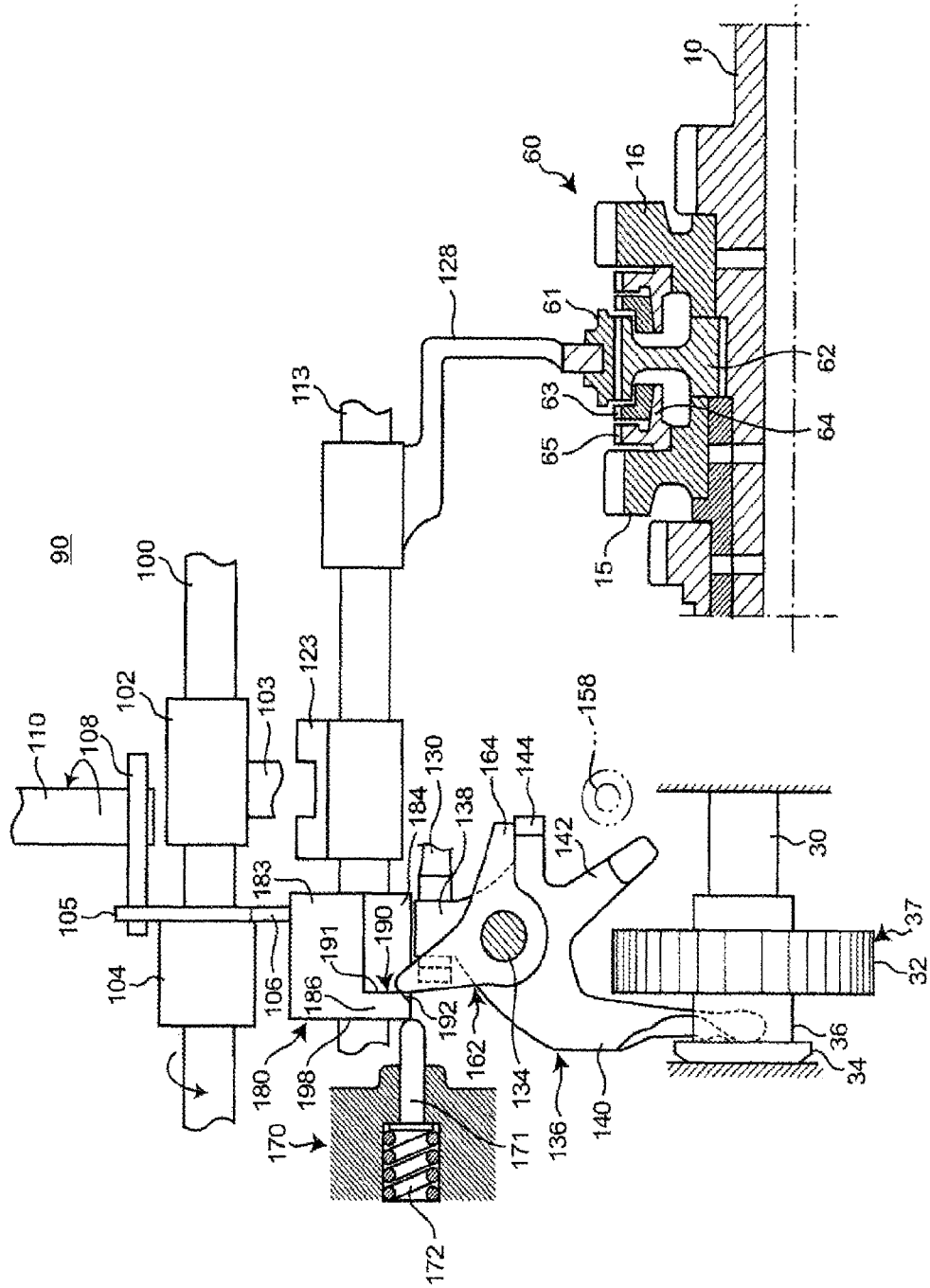
FIG. 5 is a view as viewed on the plane B-B shown in FIG. 4.

Next, a transmission operating mechanism 90 for the manual transmission 1 will be described with reference to FIGS. 2-5. FIGS. 2 and 4 illustrate essential parts of the transmission operating mechanism 90 as viewed from the other side opposite from the engine in the axial direction, FIG. 3 is a view as viewed on the plane A-A shown in FIG. 2, and FIG. 5 is a view as viewed on the plane B-B shown in FIG. 4.

Figure 3:
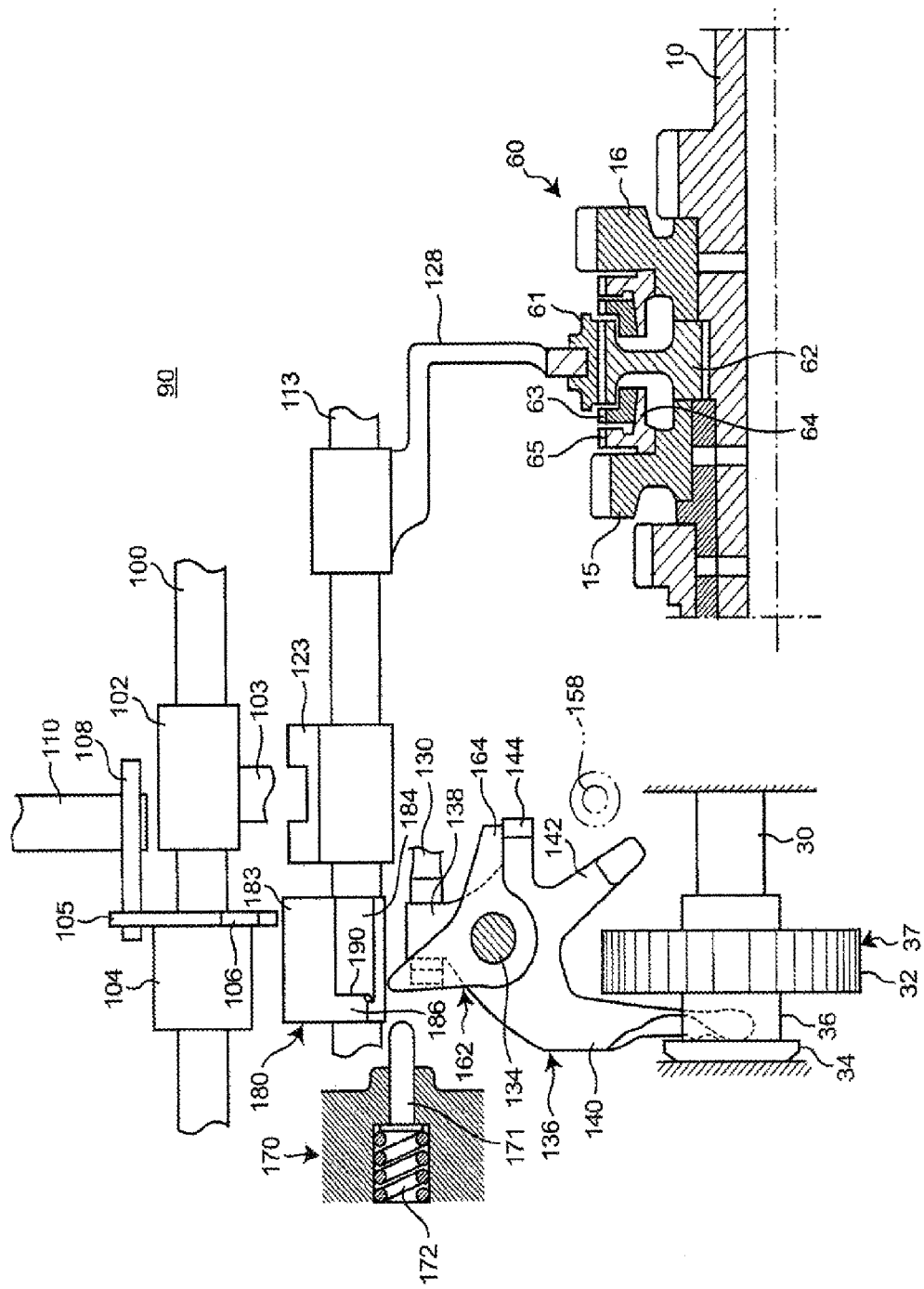
FIG. 3 is a view as viewed on the plane A-A shown in FIG. 2.

As illustrated in FIGS. 2 and 3, the transmission operating mechanism 90 includes a control rod 100 which runs parallel to the primary shaft 10. The control rod 100 is supported in a transmission case 80 such that the control rod 100 is rotatable on its axis and prevents its axial movement. By preventing the axial movement of the control rod 100 in this manner, a portion of the transmission case 80 to house the control rod 100 can have a reduced size in the axial direction.

A shift finger 102 is fitted to the control rod 100 such that the shift finger 102 is movable and rotatable in the axial direction. The shift finger 102 includes a finger portion 103 extending radially outward from a peripheral portion thereof.

An interlock sleeve 104 is fixed to the control rod 100. The interlock sleeve 104 includes an interlock restrictor (not shown), which rotates together with the control rod 100 so that the shift finger 102 rotates synchronously with the control rod 100 via the restrictor. A selection plate 105 is fixed to the interlock sleeve 104, and an outer peripheral portion of the selection plate 105 has a push lever 106 protruding radially outward. The push lever 106 forms part of the pre-balk mechanism to be described later.

A selection lever shaft 110 is arranged over the control rod 100 to rotate in sync with a select operation using the shift lever. The selection lever shaft 110 runs through the transmission case 80, and extends substantially perpendicularly to the control rod 100 (e.g., vertically). A selection lever 108 engaged with the selection plate 105 is fixed to a lower end portion of the selection lever shaft 110.

A shift rod for the first and second gears (not shown), a shift rod 112 for the third and fourth gears, and a shift rod 113 for the fifth and sixth gears are arranged under and parallel to the control rod 100. A shift rod end 121 for the first and second gears is fixed to the shift rod for the first and second gears. A shift rod end 122 for the third and fourth gears is fixed to the shift rod 112 for the third and fourth gears. A shift rod end 123 for the fifth and sixth gears is fixed to the shift rod 113 for the fifth and sixth gears. Each shift rod is supported in the transmission case 80 so as to be slidable axially. In this embodiment, a reverse shift rod end 120 is spline-fitted to the shift rod 112 for the third and fourth gears, and the shift rod 112 for the third and fourth gears serves as a reverse shift rod, too.

The tip end portions of the shift rod ends 120, 121, 122, and 123 are arranged side by side along the circumference of the shift finger 102 such that one of the tip end portions gets selectively engaged with the finger portion 103 of the shift finger 102.

Responsive to a select operation is performed which has been performed using the shift lever, the selection lever 108 rotates on its axis together with the selection lever shaft 110. In this case, as illustrated in FIGS. 2 and 4, the selection plate 105 engaging with the selection lever 108 rotates on its axis together with the control rod 100. As a result, the shift finger 102 rotates synchronously with the control rod 100 rotating, and the finger portion 103 of the shift finger 102 gets engaged with one of the shift rod ends 120-123 associated with the selected position of the shift lever.

Also, responsive to a shift operation which has been performed using the shift lever, the shift finger 102 moves on the control rod 100 in the axial direction.

When a shift operation is performed with a position corresponding to any one of the forward gears selected, a shift rod, including one of the shift rod ends 121-123 engaged with the finger portion 103 of the shift finger 102, moves axially via that one of the shift rod ends 121-123. In this case, the sleeve 41, 51, 61 of an associated one of the synchronizers 40, 50, and 60 moves axially synchronously with the axial movement of that shift rod, thus transmitting power through one of the forward gear trains G1-G6 to which the position has been shifted.

For example, if a shift operation to the fifth gear has been performed, not only the shift rod 113 for the fifth and sixth gears but also a shift fork 128 for the fifth and sixth gears, which is fixed to the shift rod 113, and the sleeve 61 of the synchronizer 60 engaged with the shift fork 128 slide axially toward the engine. The slide of this sleeve 61 causes a synchronizer ring 63 to be pressed against a cone surface 64 near the fifth-gear primary gear 15 (see FIG. 6). As a result, the rotation of the primary gear 15 gets synchronized with the rotation of the primary shaft 10 via the synchronizer ring 63, the sleeve 61, and the hub 62. When the sleeve 61 further slides toward the primary gear 15 to mesh with both of the hub 62 and a synchronization gear 65 fixed to the primary gear 15, the primary gear 15 gets coupled to the primary shaft 10.

Even if the shift operation to another one of the forward gears, other than the fifth gear, has been performed, a similar operation enables transmission of power through a forward gear train corresponding to that forward gear selected.

On the other hand, if a shift operation is performed with a reverse position selected as illustrated in FIGS. 4 and 5, the reverse shift rod (the shift rod for the third and fourth gears) 112 does not move axially, but the reverse shift rod end 120 moves on the rod 112 in the axial direction. A reverse arm 130 is fixed to the reverse shift rod end 120, and a reverse lever 136 is engaged with a tip end portion of the reverse arm 130. When the reverse arm 130 moves axially together with the reverse shift rod end 120, the reverse lever 136 swings in conjunction with the axial movement. This causes the reverse idler gear 37 engaged with a swing end portion 140 of the reverse lever 136 to slide from a neutral position on the reverse shaft 30 (the slide position illustrated in FIG. 5) to the position at which the reverse idler gear 37 meshes with the primary and secondary reverse gears 17 and 27 (the slide position illustrated in FIG. 7), thus transmitting power through the reverse gear.

As illustrated in FIG. 3, the reverse idler gear 37 includes a subgear 32, a flange 34, and a recessed groove 36. The subgear 32 is arranged at one axial end of the reverse idler gear 37 so as to mesh with the primary and secondary reverse gears 17 and 27. The flange 34 is arranged at the other axial end and has the form of a flange. The recessed groove 36 has been cut between the subgear 32 and the flange 34 in an axial direction such that the swing end portion 140 of the reverse lever 136 is engaged with the groove 36.

As illustrated in FIGS. 2 and 3, the reverse lever 136 is rotatably supported by a spindle 134 which is arranged in a substantially horizontal direction that is substantially perpendicular to the reverse shaft 30. The spindle 134 is supported by the transmission case 80 with a bracket 135 interposed between them. A helical spring (not shown) is interposed between the bracket 135 and the reverse lever 136. The helical spring urges the reverse lever 136 clockwise around the spindle 134 in FIG. 3.

The swing end portion 140 of the reverse lever 136 is formed to extend downward from the portion supported by the spindle 134. An upper end portion of the reverse lever 136 includes an engagement protrusion 138, which gets engaged with a recess at the tip end of the reverse arm 130. The recess is U-shaped on a plan view. The reverse lever 136 further includes a switch contact arm 142 that is contactable with a reverse switch 158 fixed to the transmission case 80. When the swing of the reverse lever 136 causes the reverse idler gear 37 to slide to, and reach, the meshing position, the switch contact arm 142 contacts with the reverse switch 158 (see FIG. 7), thereby sensing a reverse shift state. The reverse lever 136 further includes a restrictor 144 that restricts the rotation of a pre-balk pin 162 to be described below. The restrictor 144 is formed to protrude to either side in the axial direction of the spindle 134.

Next, the pre-balk mechanism used in this embodiment will be described. To get the reverse idler gear 37 engaged smoothly with the primary reverse gear 17 inertially rotating together with the primary shaft 10 at a start of a shift operation to the reverse gear, the pre-balk mechanism utilizes the swing of the reverse lever 136 at an early stage of the shift operation to the reverse gear, i.e., at an early stage of the time period during which the shift operation causes the reverse lever 136 to swing, to activate the synchronizer 60 for the fifth and sixth gears in such a direction as to enable transmission of power through the fifth gear train G5. In this manner, the pre-balk mechanism brakes the inertial rotation of the primary shaft 10.

To perform this function, the pre-balk mechanism includes a pre-balk pin 162 secured rotatably to the spindle 134, a pre-balk lever 180 attached to the shift rod 113 for the fifth and sixth gears, and a push lever 106 provided for the interlock sleeve 104 as illustrated in FIGS. 2 and 3.

The pre-balk pin 162 is rotatably secured to the spindle 134 while being urged clockwise around the spindle 134 in FIG. 3 about by the helical spring (not shown) interposed between the pre-balk pin 162 and the reverse lever 136.

Figure 8:
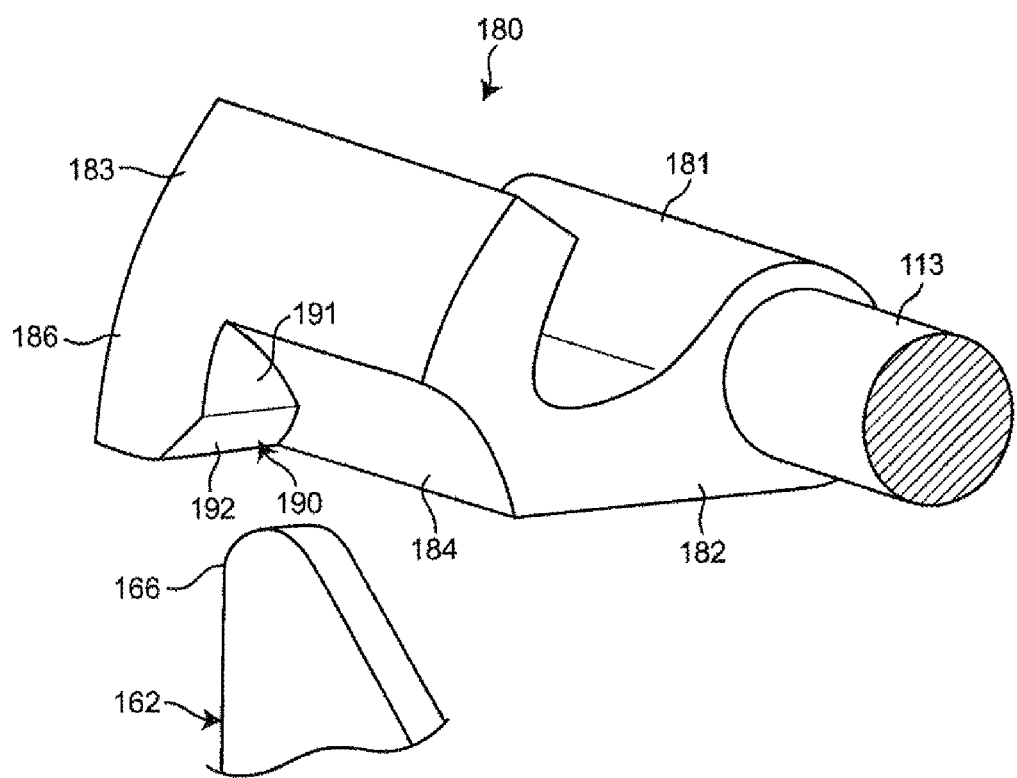
FIG. 8 is a perspective view of a pre-balk lever.

The pre-balk pin 162 has a substantially triangular shape when viewed in an axial direction of the spindle 134, and a tip end corner portion 166 of the pre-balk pin 162 has a rounded shape (see FIG. 8).

The pre-balk pin 162 includes a pressure arm 164. When the reverse lever 136 swings counterclockwise about the spindle 134 in FIG. 3, the pressure arm 164 is pressed against the restrictor 144 of the reverse lever 136. The engagement between the restrictor 144 and the pressure arm 164 allows the pre-balk pin 162 to rotate, together with the reverse lever 136, counterclockwise around the spindle 134 in FIG. 3 in sync with a reverse shift operation using the shift lever.

On the other hand, if a shift operation has been performed to cause the shift lever to go back from the reverse position to the neutral position and to cause, synchronously with the shift operation, the reverse lever 136 to swing in the opposite direction from when the reverse shift operation is performed (i.e., clockwise in FIG. 3), the pressure arm 164 of the pre-balk pin 162 does not engage with the restrictor 144 of the reverse lever 136, and the pre-balk pin 162 gets ready to rotate relative to the reverse lever 136. For this reason, even if the interference between the pre-balk pin 162 and the pre-balk lever 180 prevents the pre-balk pin 162 from rotating clockwise in FIG. 3 as will be described later, the reverse lever 136 can still swing clockwise (see FIG. 9).

As illustrated in FIG. 8, the pre-balk lever 180 includes a cylindrical portion 181 through which the shift rod 113 for the fifth and sixth gears runs, a lever body 182 extending radially outward from the cylindrical portion 181, and a claw 183 at the tip end of the lever body 182.

As illustrated in FIG. 2, the pre-balk lever 180 is rotatably mounted on the shift rod 113 while being urged clockwise around the shift rod 113 in FIG. 2 so that when no load is applied thereto, the lever body 182 can be kept inclined slightly upward from its basal end to its tip end relative to the horizontal direction. The pre-balk lever 180 is mounted on the shift rod 113 so as to prevent its axial movement.

Returning back to FIG. 8, the claw 183 extends circumferentially upward from the tip end of the lever body 182. A corner portion defined by the tip end of the lever body 182 and the basal end of the claw 183 has a notch 184 that has a substantially arch shape when viewed in the axial direction. A protrusion 186 is provided closer to the engine in the axial direction than the notch 184 is. The protrusion 186 runs circumferentially continuously with the claw 183 so as to protrude downward from the lower end of the claw 183.

A side surface 190 of the protrusion 186 that faces away from the engine has an upper side surface portion 191 and a lower side surface portion 192. The upper side surface portion 191 is arranged substantially perpendicularly to the axial direction. The lower side surface portion 192 is arranged along a plane which is inclined downward from the lower end of the upper side surface portion 191 toward the engine in the axial direction. An obtuse angle corner is defined between the upper and lower side surface portions 191 and 192.

As illustrated in FIG. 3, the pre-balk mechanism further includes a return mechanism 170 that causes the axial position of the shift rod 113 for the fifth and sixth gears to go back from the position at which the synchronizer 60 is activated to the position at which the synchronizer 60 is deactivated. The return mechanism 170 includes a pressure pin 171 and a coil spring 172. The pressure pin 171 sticks out from inside of the transmission case 80 so as to project toward, and retract from, the non-engine side in the axial direction. The coil spring 172 is arranged in the wall of the transmission case 80. As illustrated in FIG. 5, when the reverse select operation has been performed, the tip end of the pressure pin 171 is pressed against a surface 198 of the pre-balk lever 180 that faces the engine in the axial direction. In such a state, the coil spring 172 urges the pre-balk lever 180 in such a direction as to deactivate the synchronizer 60, i.e., away from the engine in the axial direction, via the pressure pin 171.

If a detent mechanism is adopted as the return mechanism 170, the shift rod 113 needs to be extended, and the extended portion of the shift rod 113 needs to have a peripheral groove on its outer periphery. On the other hand, in this embodiment, the coil spring 172 is adopted as the return mechanism 170, and there is no need for subjecting the shift rod 113 to any special machining. Thus, the shift rod 113 can be shortened compared to when the detent mechanism is adopted. Consequently, the manual transmission 1 can be downsized.

Next, it will be described how the pre-balk mechanism operates.

First, as illustrated in FIGS. 2 and 3, in a situation where the selected position is neutral position, the pre-balk lever 180 is positioned to engage with neither the pre-balk pin 162 nor the push lever 106 of the interlock sleeve 104. In this situation, the pressure pin 171 of the return mechanism 170 does not contact with the pre-balk lever 180.

When a select operation is performed using the shift lever to shift from the neutral position to the reverse position, the shift finger 102 rotates counterclockwise on its axis to reach a reverse select position in FIG. 4 synchronously with the rotation of the control rod 100, and the push lever 106 of the interlock sleeve 104 rotating together with the shift finger 102 contacts with the upper surface of the claw 183 of the pre-balk lever 180 to press the claw 183 down, as illustrated in FIGS. 4 and 5. This causes the pre-balk lever 180 to rotate counterclockwise to a predetermined rotation position in FIG. 4, and also causes the protrusion 186 of the pre-balk lever 180 to move downward so that a tip end portion of the pre-balk pin 162 engages with the side surface 190 of the protrusion 186 that faces away from the engine as illustrated in FIG. 5. In this manner, the side surface 190 of the protrusion 186 functions as an engagement portion engaging with the tip end portion of the pre-balk pin 162 when the reverse select operation has been performed.

In a situation where the tip end portion of the pre-balk pin 162 is engaged with the engagement portion 190 of the pre-balk lever 180 at a predetermined engagement position, a narrow space is left between the engagement portion 190 and the tip end portion of the pre-balk pin 162. In this situation, the engagement portion 190 of the pre-balk lever 180 is located closest to the tip end portion of the pre-balk pin 162 in the vicinity of the upper end of the lower side surface portion 192 thereof.

While the pre-balk lever 180 is rotating toward the predetermined rotation position in sync with the reverse select operation, the tip end portion of the pre-balk pin 162 is prevented in principle from contacting with the pre-balk lever 180. However, if the tip end portion of the pre-balk pin 162 contacted with the lower side surface portion 192 of the protrusion 186 of the pre-balk lever 180 due to error caused between individual products or during an assembling process, the inclination of the lower side surface portion 192 would guide the tip end portion of the pre-balk pin 162 to the predetermined engagement position with respect to the engagement portion 190.

As can be seen, the lower side surface portion 192 functions as a guide surface, which guides the tip end portion of the pre-balk pin 162 to the predetermined engagement position with respect to the engagement portion 190 while the pre-balk lever 180 is rotating toward the predetermined rotation position in sync with a reverse select operation that has been performed with the shift lever. Even if the pre-balk lever 180 contacts with the pre-balk pin 162 as described above, the guide surface 192 would still allow the pre-balk lever 180 to continuously rotate until the pin 162 reaches the predetermined rotation position, while guiding the tip end portion of the pre-balk pin 162 to the predetermined engagement position.

Thus, the gap to be left between the engagement portion 190 of the pre-balk lever 180 and the tip end portion of the pre-balk pin 162 that are engaged with each other can be minimized. Even if only such a narrow gap is left, the pre-balk pin 162 and the pre-balk lever 180 can still get engaged with each other properly without letting the pre-balk pin 162 and the pre-balk lever 180 interfere with each other and obstruct the rotation of the pre-balk lever 180.

Also, in the reverse select position, the pressure pin 171 of the return mechanism 170 contacts with the side surface 198 of the pre-balk lever 180 that faces the engine as described above, and the coil spring 172 applies an urging force to the pre-balk lever 180. The urging force applied by the coil spring 172 is supposed to act only when a reverse position selected, not when a neutral position or a position corresponding to a forward gear is selected. Thus, when a shift operation to the fifth gear is performed with the shift lever, it is possible to prevent the coil spring 172 from applying an urging force to the shift rod for the fifth and sixth gears through the pre-balk lever 180. Consequently, the operability of the shift operation to the fifth gear is not affected at all.

Figure 6:
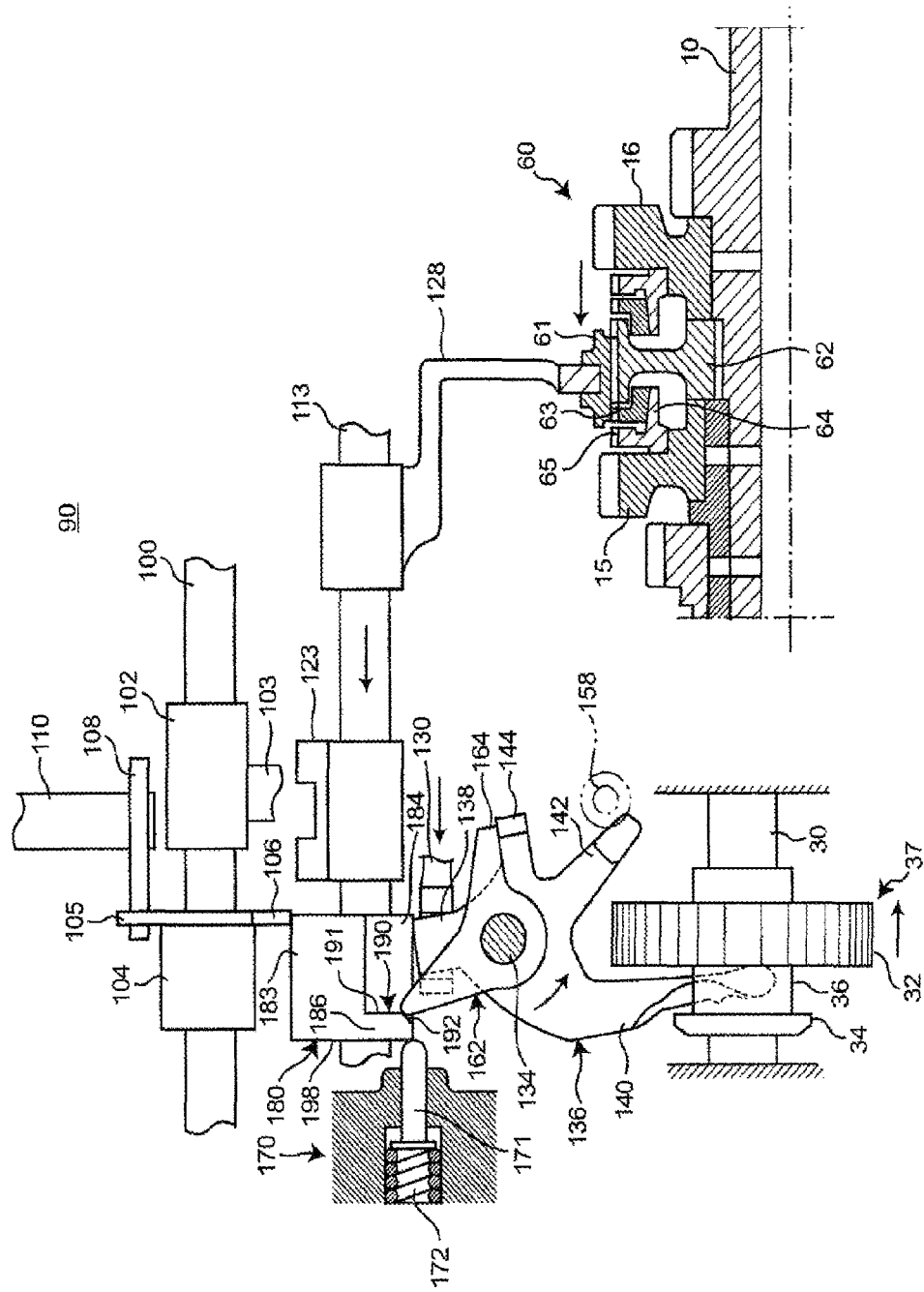
FIG. 6 illustrates the transmission operating mechanism at an early stage of the time period during which a reverse lever is swung by a reverse shift operation as viewed in the same direction as in FIG. 5.

Subsequently, if a reverse shift operation is performed with the shift lever in such a reverse select position, the reverse arm 130 moves axially toward the engine together with the reverse shift rod end 120, and the reverse lever 136 engaged with the tip end of the reverse arm 130 swings counterclockwise on the spindle 134, as illustrated in FIG. 6.

In this case, the tip end portion of the pre-balk pin 162 is arranged so as to face away from the engine in the axial direction with respect to the engagement portion 190 of the pre-balk lever 180 and engaged with the engagement portion 190. Thus, when the reverse lever 136 swings as described above, the pre-balk lever 180 is thrust axially toward the engine by the pre-balk pin 162 swinging together with the reverse lever 136. This causes the shift rod 113 for the fifth and sixth gears to move axially toward the engine, i.e., in such a direction as to activate the synchronizer 60 for the fifth and sixth gears, together with the pre-balk lever 180. Specifically, the shift rod 113 axially moves the sleeve 61 of the synchronizer 60 for the fifth and sixth gears toward the engine via the shift fork 128, thereby getting the sleeve 61 fitted into the synchronizer ring 63. Thus, the synchronizer ring 63 is pressed against the cone surface 64 near the fifth-gear primary gear 15 to synchronize the rotation of the primary gear 15 with that of the primary shaft 10. When a reverse shift operation is performed while the vehicle is at a stop, the primary gear 15 is at rest. That is why by synchronizing this primary gear 15 at rest with the primary shaft 10, a braking force acts on the inertial rotation of the primary shaft 10.

As described above, in the reverse select position, only a narrow gap is left between the tip end portion of the pre-balk pin 162 and the engagement portion 190 of the pre-balk lever 180. Thus, as soon as the pre-balk pin 162 starts swinging in sync with the reverse shift operation using the shift lever, the tip end portion of the pre-balk pin 162 thrusts the pre-balk lever 180 toward the engine in the axial direction. In other words, the pre-balk lever 180 and the shift rod 113 start moving axially at substantially the same time as when the pre-balk pin 162 starts swinging.

Also, when the pre-balk lever 180 moves axially toward the engine in sync with the reverse shift operation, the coil spring 172 is thrust toward the engine, and is compressed, by the pre-balk lever 180 via the pressure pin 171, as illustrated in FIG. 6.

Figure 7:
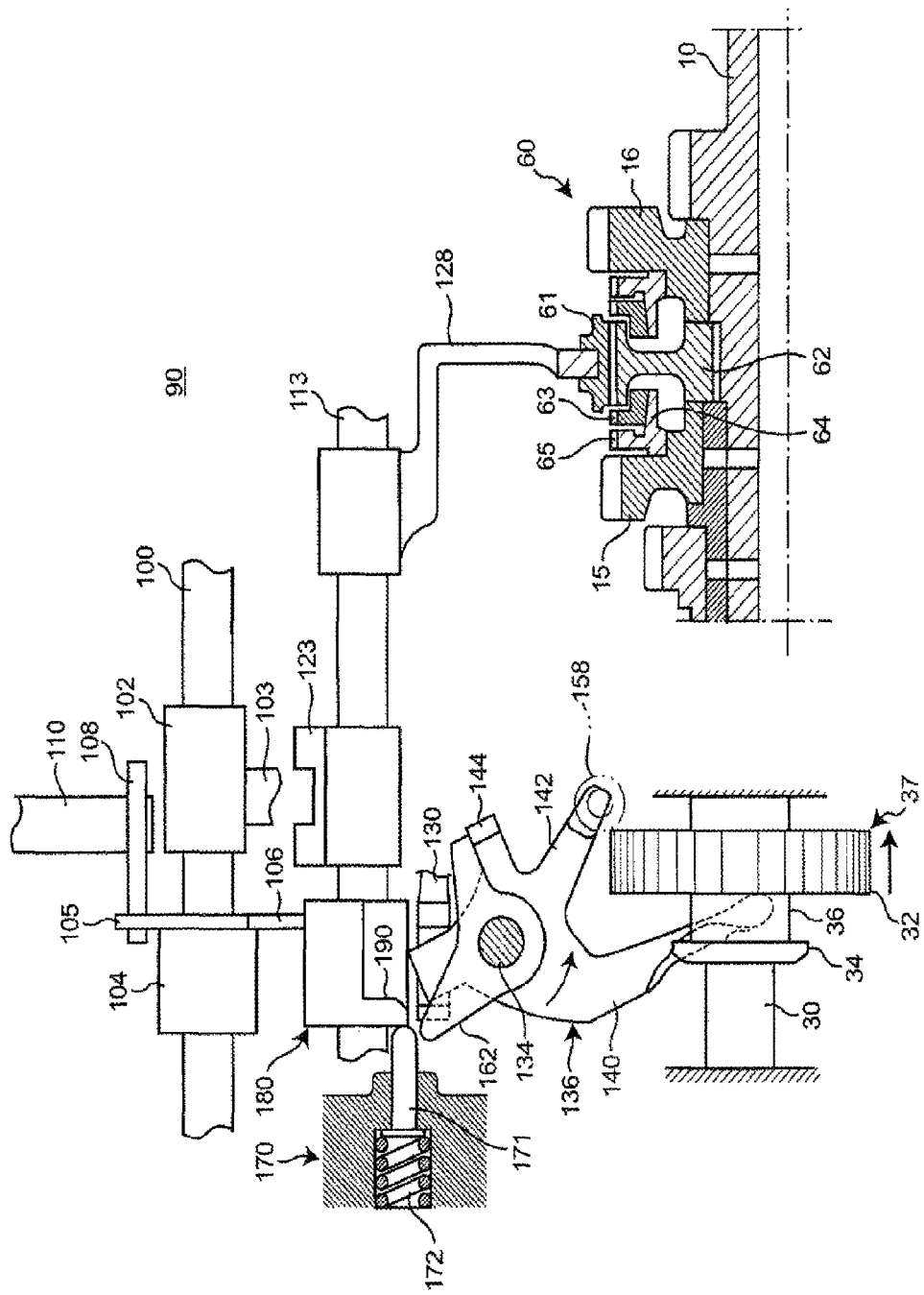
FIG. 7 illustrates the transmission operating mechanism in a reverse shift position as viewed in the same direction as in FIG. 6.

Subsequently, as illustrated in FIG. 7, when the reverse lever 136 further swing to reach a middle stage of its swing period, the tip end portion of the pre-balk pin 162 rotating together with the reverse lever 136 moves downward to get disengaged from the engagement portion 190 of the pre-balk lever 180. When the pre-balk pin 162 is disengaged from the pre-balk lever 180 in this manner, the coil spring 172 that has been compressed decompresses and thrusts the pre-balk lever 180 away from the engine in the axial direction via the pressure pin 171. This forces the shift rod 113 for the fifth and sixth gears to move axially away from the engine together with the pre-balk lever 180 and go back to the neutral position. In the meantime, the sleeve 61 of the synchronizer 60 is also forced to move axially away from the engine and go back to the neutral position, thus deactivating the synchronizer 60.

After transmission of power through the fifth gear has been disabled completely upon the deactivation of the synchronizer 60, the reverse idler gear 37 sliding reaches the meshing position. At this time, the primary and secondary reverse gears 17 and 27 are both at rest, which allows the reverse idler gear 37 to mesh with both of these gears 17 and 27 smoothly and eliminates the gear rattle perfectly.

As described above, as soon as a reverse shift operation is performed, the pre-balk lever 180 and the shift rod 113 start moving axially in response, and therefore, the synchronizer 60 also starts working right away. As a result, the inertial rotation of the primary shaft 10 can be braked immediately, and the gear rattle can be prevented even more effectively. Furthermore, such accelerated braking on the rotation of the primary shaft 10 results in shortening the sliding stroke of the reverse idler gear 37, and eventually, cutting down the size of the reverse idler gear 37 and its surrounding members.

Finally, it will be described with reference to FIG. 9 how this manual transmission works in sync with a shift operation that has been performed to change the shift lever positions from the reverse shift position back to the neutral position (hereinafter referred to as a "back shift operation") and a select operation for the same purpose (hereinafter referred to as "back select operation").

Figure 9:
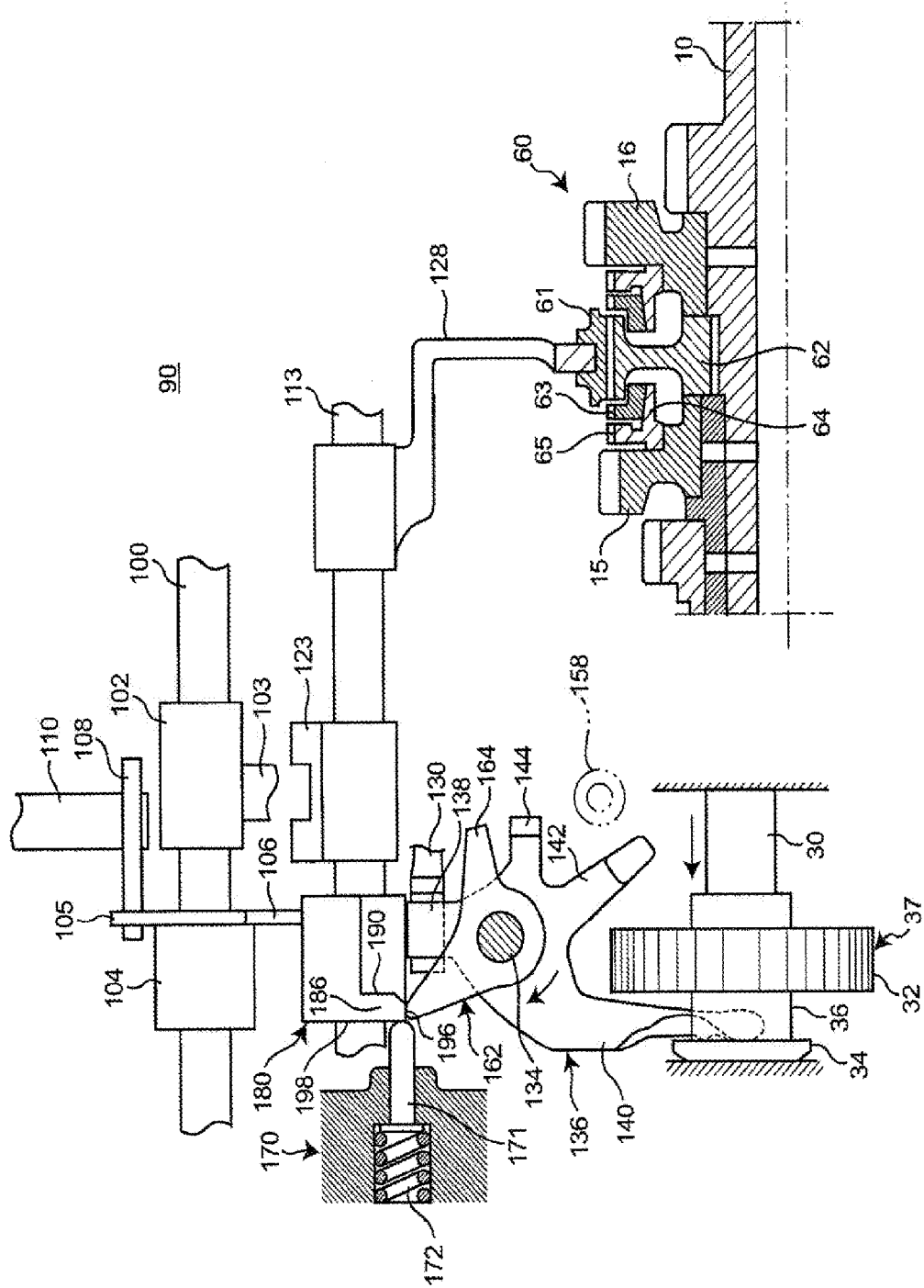
FIG. 9 illustrates the transmission operating mechanism in a situation where a shift operation is performed to cause a shift lever to go back from a reverse position to a neutral position, as viewed in the same direction as in FIG. 7.
Figure 10:
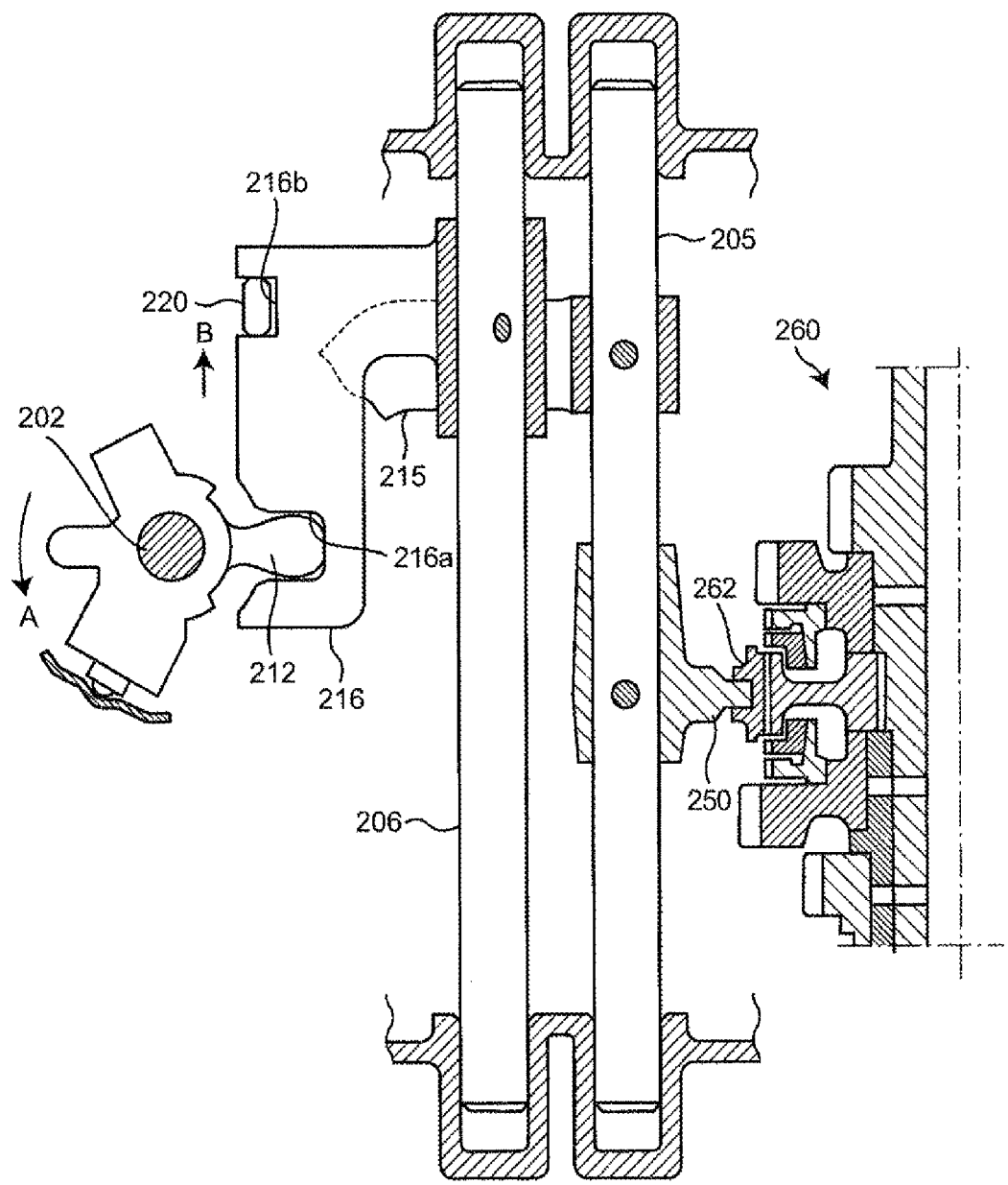
FIG. 10 is a plan view of a transmission operating mechanism for a manual transmission according to the conventional art.
Figure 11:
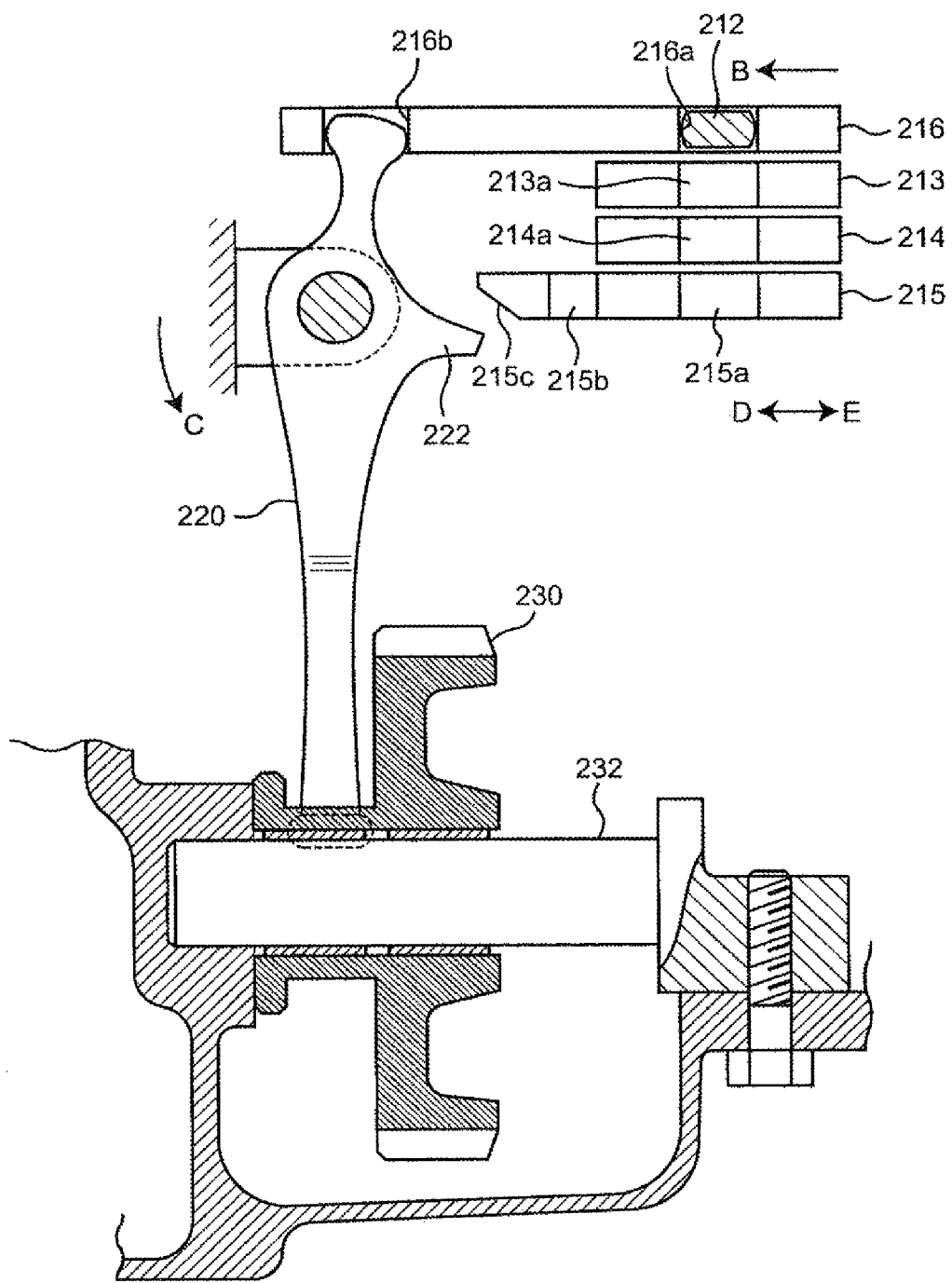
FIG. 11 is a side view of the transmission operating mechanism.
Figure 12:
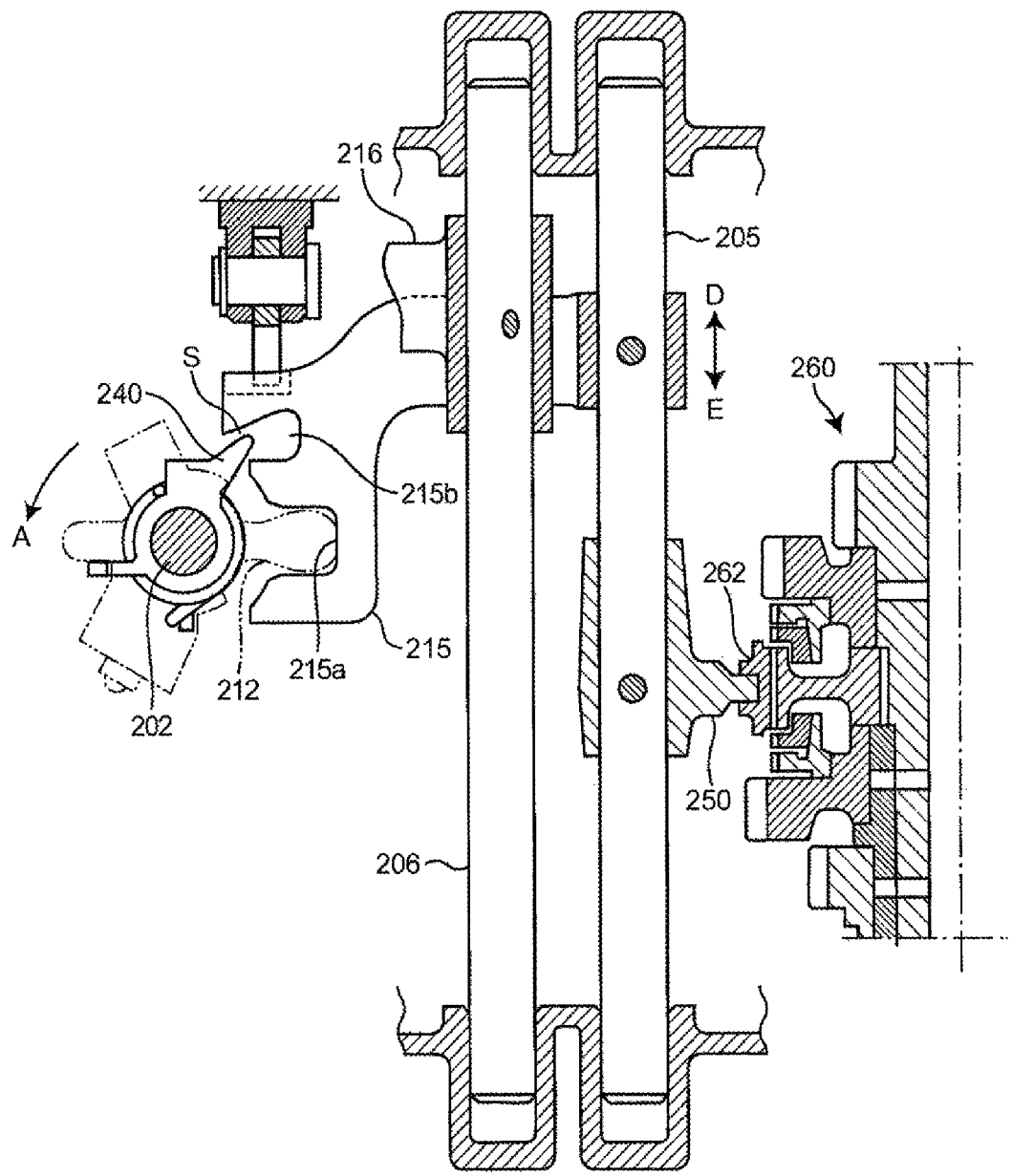
FIG. 12 is a plan view of a pre-balk mechanism of the transmission operating mechanism.

When the back shift operation is performed using the shift lever, the urging force applied by the helical spring (not shown) between the reverse lever 136 and the bracket 135 forces the reverse lever 136 to rotate in the opposite direction from when the reverse shift operation was performed, i.e., clockwise in FIG. 9. In response, the urging force applied by the helical spring (not shown) between the reverse lever 136 and the pre-balk pin 162 forces the pre-balk pin 162 to rotate in the same direction as the reverse lever 136 in an early stage of the time period during which the reverse lever 136 swings in sync with the back shift operation. In the middle of the swinging period, however, the tip end portion of the pre-balk pin 162 contacts with the lower surface 196 of the protrusion 186 of the pre-balk lever 180, thus prohibiting the pre-balk pin 162 from rotating any further.

Even if the swing of the pre-balk pin 162 is restricted by the interference between the pre-balk pin 162 and the pre-balk lever 180 in this manner, the pre-balk pin 162 is still rotatable relative to the reverse lever 136 when the reverse lever 136 swings in the opposite direction from when the reverse shift operation was performed. Thus, the reverse lever 136 can continue swinging clockwise as shown in FIG. 9, and can go back to the neutral position without fail.

Furthermore, when a back select operation is performed using the shift lever, the push lever 106 moves upward as the control rod 100 rotates, thus getting the push lever 106 and the pre-balk lever 180 that are engaged together as illustrated in FIG. 4 disengaged from each other. Upon this disengagement, the pre-balk lever 180 is forced to rotate back to the neutral position under the urging force described above, and the protrusion 186 of the pre-balk lever 180 moves upward. This eliminates the interference between the protrusion 186 and the tip end portion of the pre-balk pin 162. The pre-balk pin 162 restarts rotating clockwise in FIG. 9 to go back to the neutral position. As a result, the pre-balk pin 162 never fails to return to the neutral select position illustrated in FIGS. 2 and 3.

Although the present invention has been described by way of illustrative embodiments, the present invention is not limited to those embodiments.

For example, the pre-balk mechanism of the embodiments described above is configured to activate, as the reverse lever 136 swings, the synchronizer 60 for the fifth and sixth gears in such a direction as to enable transmission of power through the fifth gear train G5. However, according to the present invention, the pre-balk mechanism may also be configured to activate the synchronizer 60 in such a direction as to enable transmission of power through the sixth gear train G6, or activate any other synchronizer in such a direction as to enable transmission of power through another forward gear train.

As can be seen from the foregoing description, a manual transmission according to the present invention including a sliding-mesh reverse gear train can eliminate gear rattle during a shift operation to a reverse gear, while cutting down the size of a reverse idler gear and its surrounding members. Thus, the present invention may be used advantageously in the industrial field of manufacturing manual transmissions of this type.

The invention claimed is:

1. A manual transmission comprising:
   a primary shaft coupled through a connector/disconnector to a vehicle-driving source;
   a secondary shaft arranged parallel to the primary shaft;
   a plurality of forward gear trains arranged between the primary and secondary shafts;
   a reverse gear train including
      a primary reverse gear fixed on the primary shaft,
      a secondary reverse gear fixed on the secondary shaft, and
      a reverse idler gear arranged slidably on a reverse shaft that is arranged parallel to the primary and secondary shafts, the reverse idler gear being configured to slide from a neutral position on the reverse shaft to a mesh position at which the reverse idler gear meshes with the primary and secondary reverse gears to enable transmission of power through a reverse gear;
   at least one shift rod configured to move axially in sync with a shift operation using a shift lever to selectively transmit power through one of the forward gear trains via at least one synchronizer;
   a control rod arranged parallel to the shift rod and configured to rotate in sync with a select operation using the shift lever;
   a reverse lever configured to, in a situation where a reverse select operation is performed with the shift lever, swing in sync with a reverse shift operation using the shift lever to slide the reverse idler gear from the neutral position to the mesh position; and
   a pre-balk mechanism configured to activate a predetermined synchronizer during an early stage of a time period during which the reverse lever swings and to deactivate the predetermined synchronizer during a middle stage of the time period, the predetermined synchronizer enabling transmission of power through any one of the forward gear trains, wherein
   the pre-balk mechanism includes
   a pre-balk pin configured to swing together with the reverse lever in sync with the reverse shift operation using the shift lever, and
   a pre-balk lever arranged on a predetermined shift rod, which activates the predetermined synchronizer, so as to be rotatable on its axis but prevent its axial movement, the pre-balk lever rotating to a predetermined rotation position in sync with the rotation of the control rod when the reverse select operation is performed with the shift lever,
      the pre-balk lever includes an engagement portion engaging with a tip end portion of the pre-balk pin at the predetermined rotation position such that when the reverse lever swings in sync with the reverse shift operation with the engagement portion engaging with the pre-balk pin, the predetermined shift rod moves in such a direction as to activate the predetermined synchronizer via the pre-balk pin and the pre-balk lever, and
      the engagement portion has a guide surface configured to guide the tip end portion of the pre-balk pin to a predetermined engagement position at which the tip end portion engages with the engagement portion while the pre-balk lever is rotating toward the predetermined rotation position in sync with the reverse select operation using the shift lever.

2. The manual transmission of claim 1 further comprising:
   a return mechanism configured to cause an axial position of the predetermined shift rod to go back from a position at which the predetermined synchronizer is activated to a position at which the predetermined synchronizer is deactivated, wherein
   the return mechanism includes a spring configured to urge the pre-balk lever axially toward the position at which the predetermined synchronizer is deactivated.

3. The manual transmission of claim 2, wherein
   the spring is configured to apply an urging force to the pre-balk lever only when a reverse select operation has been performed.

4. The manual transmission of claim 3, wherein
the pre-balk pin is arranged to be rotatable relative to the reverse lever when the reverse lever swings in an opposite direction from when the reverse shift operation is performed with the shift lever.

5. The manual transmission of claim 1, wherein
the pre-balk pin is arranged to be rotatable relative to the reverse lever when the reverse lever swings in an opposite direction from when the reverse shift operation is performed with the shift lever.

6. The manual transmission of claim 2, wherein
the pre-balk pin is arranged to be rotatable relative to the reverse lever when the reverse lever swings in an opposite direction from when the reverse shift operation is performed with the shift lever.

* * * * *